United States Patent [19]

Felder et al.

[11] 4,314,354
[45] Feb. 2, 1982

[54] MEMORY PROGRAMMABLE CONTROL

[75] Inventors: Heinz-Friedrich Felder, Erlangen; Manfred Schlang, Heroldsbach, both of Fed. Rep. of Germany

[73] Assignee: Siemens Aktiengesellschaft, Berlin and Munich, Fed. Rep. of Germany

[21] Appl. No.: 77,152

[22] Filed: Sep. 19, 1979

[30] Foreign Application Priority Data

Sep. 28, 1978 [DE] Fed. Rep. of Germany ....... 2842372

[51] Int. Cl.³ .............................................. G06F 9/06
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,631,406 | 12/1971 | Kurner | 364/200 |
| 3,921,146 | 11/1975 | Danco | 364/900 |
| 3,942,158 | 3/1976 | Dummermuth | 364/900 |
| 4,064,394 | 12/1977 | Allen | 364/200 |

Primary Examiner—Raulfe B. Zache
Attorney, Agent, or Firm—Kenyon & Kenyon

[57] ABSTRACT

A memory programmable control with a processing unit, a program memory, input modules and output modules in which a memory is provided for storing a process image which is renewed in every processing cycle. The process image is an image of the signal states of the initial states of the inputs and outputs. During the processing of a control program, the processing unit does not work with the input and output modules, but exclusively with the process image. This increases the processing speed and prevents flutter of the outputs.

2 Claims, 1 Drawing Figure

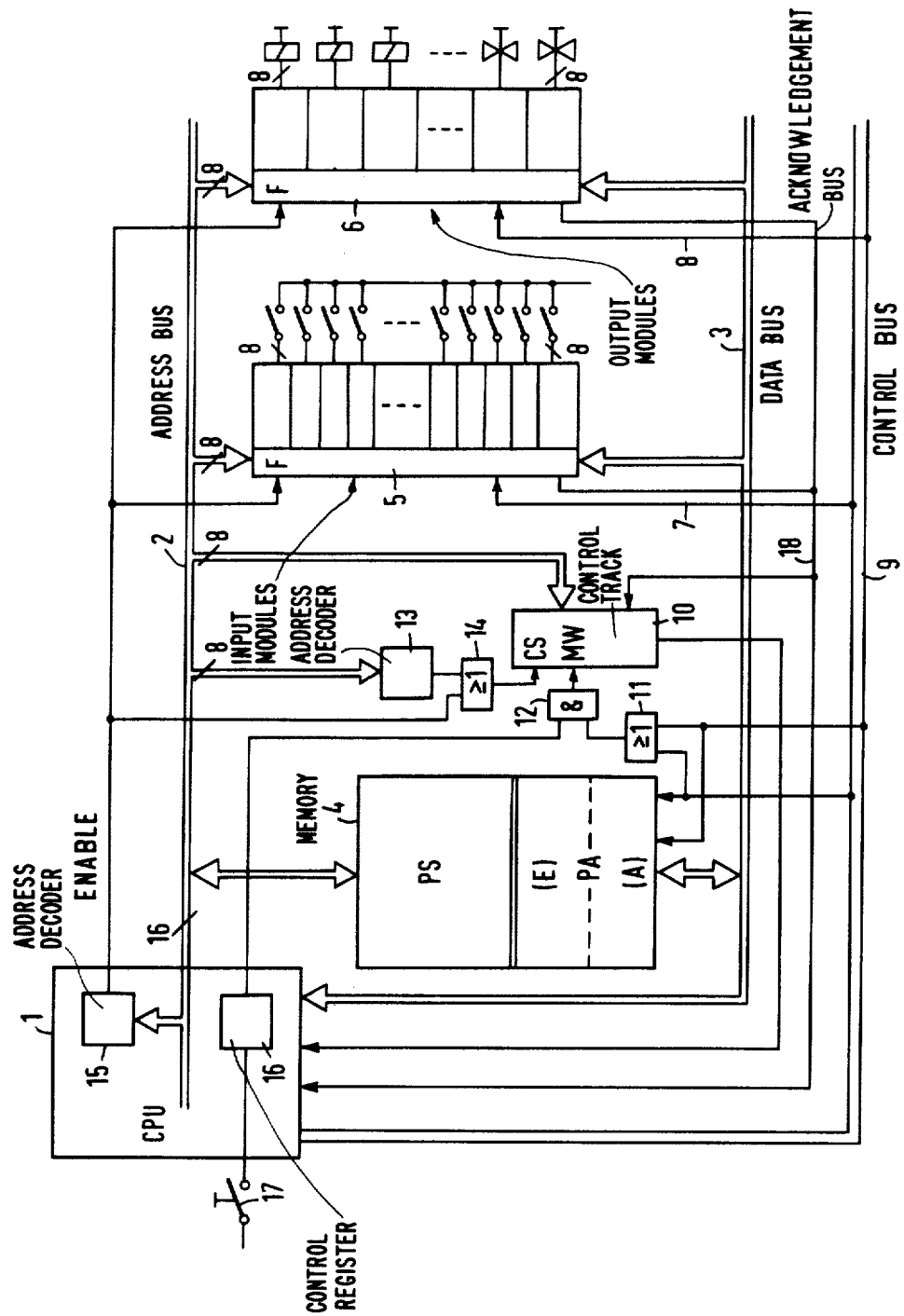

MEMORY PROGRAMMABLE CONTROL

BACKGROUND OF THE INVENTION

This invention relates to a memory programmable control with a central processing unit which is connected to a program memory for receiving a control program, as well as with input modules having a number of inputs for the signal states from the process and with output modules having a number of outputs for the output states for the process. Such a memory-programmable control is known from Siemens-Zeitschrift 48 (1974), Supplement "Integrated Building Block Systems SIMATIC" pages 43 to 46, as well as Siemens-Zeitschrift 51 (1977), pages 261 to 265.

In memory programmable controls known heretofore, the central processing unit cooperates directly with the peripheral equipment connected to the inputs of the input modules and the outputs of the output modules, respectively, for instance, with indicating devices and control elements. This limits the processing speed of the control. Since a control program prescribes the sequential cyclic working up of instructions, it is possible that, during a processing cycle, outputs will be addressed in a logically contradictory manner. This can lead to a brief response of the peripheral equipment connected to an output of an output module, for instance, a signal amplifier. The error possibility is detrimental particularly in the case of inductive loads.

SUMMARY OF THE INVENTION

It is an object of the present invention to increase the processing speed in a memory programmable control of the type mentioned at the outset as well as to reliably avoid the mentioned error possibility.

According to the invention, this problem is solved by:
providing a memory for storing a process image with an input zone and an output zone,
at the beginning of each processing cycle of the control program, transferring the signal states of the inputs of the input modules block by block into the input zone of the process image,
processing the instructions of the control program in the central processing unit using the signal states stored in the process image and storing the output states so determined in the output zone of the process image,
after every process cycle, transferring the output states block by block into the output modules.

In the memory programmable control according to the present invention, the central control unit, in working up the control program, does not operate with the peripheral equipment connected to the input modules and the output modules, but with the process image. The process image is an image of the signal states of the inputs and of the output states for the outputs. It is generally updated during each operating cycle. Since the control unit works only with the process image and the output states are transferred block by block into the output modules, unintentional brief response of peripheral equipment which is connected to an output of the output groups is reliably prevented. In addition, the processing speed of the control program is increased. This is of considerable importance especially if the peripheral equipment is decentralized. With decentralized peripheral equipment, a further increase of the processing speed is possible by providing, according to a further embodiment of the invention, a further processing unit for transferring the signal states of the inputs of the input modules into the process image and/or for transferring the output states from the process image to the output modules. The further processing unit, for which in particular a microprocessor is suitable, then operates in parallel with the central processing unit and relieves the latter of transferring the process image.

BRIEF DESCRIPTION OF THE DRAWINGS

The sole FIGURE is a schematic representation of a memory programmable control, in accordance with the teaching of the invention.

DETAILED DESCRIPTION OF THE INVENTION

The FIGURE shows the design of a memory programmable control according to the present invention. To a central processing unit 1 are connected, via an address bus 2, a data bus 3 and a control bus 9, a memory unit 4 and the process signal formers, which are combined in input modules 5 and output modules 6. The input modules 5 are connected to peripheral devices which are represented schematically as signal contacts. The input modules 5 eliminate interference from the signals coming from the process and adapt them to the internal signal level of the control. If the inputs of an input module 5 are addressed byte-wise, the central processing unit 1 (CPU) supplies the address of this input module 5 to the address bus 2. An address decoder 15 in the central processing unit 1 decodes the address and gives an enabling signal to the enable input F of the input modules 5. If at the same time a read out command is delivered on the control bus 9 via the read-out command line 7, then the addressed input module reads out the signal states of the addressed inputs over the data bus 3. Simultaneously, an acknowledgement is given via the acknowledgement bus 18 to the central processing unit 1 that the respective input module is working correctly. The output modules 6 are connected to peripheral equipment which controls the process, for instance, contactors or magnetic valves. The output modules contain command storage which is followed by amplifiers for the direct addressing of the connected peripheral equipment. If the outputs of an output module are selected byte-wise, the central processing unit 1 transmits the address of this module to the address bus 2. The address decoder 15 enables the output modules via the enable input F. If simultaneously a write command is given on the control bus 9 via the write command line 8, then the command storage of the selected output module takes and stores the signal status on the data bus. At the same time, an acknowledgement signal is given to the central processing unit 1 via the acknowledgement bus 18.

The memory unit 4 is designed as a write read memory organized by words. The memory unit 4 contains, among others, a memory portion PS which is the program memory and a memory portion PA for storing the process image. The memory PA for the process image comprises an input area E and an output area A. The program memory PS contains the control program which consists of individual instructions. The central processing unit 1 reads and interprets the contents of the program memory PS. In accordance with the instructions of the control program, the signal states of inputs are, for instance, interrogated, interlinked with each other, and the result of the interlinkage is obtained as output states. The central processing unit 2 processes the instructions of the control program stored in the program memory PS sequentially and cyclically. At the beginning of each program run, the signal states of all input modules 5 are first transferred block by block to the input area of the process image PA. At the beginning of a program processing cycle, the input area E of the process image PA therefore contains an image of the signal states of all inputs. While the instructions of the control program are being worked up sequentially, the central processing unit 1, according to the present invention, operates exclusively with the process image PA. The results of the interlinking of the signal states of the inputs in accordance with the instructions of the control program are stored in the output portion A of the process image PA. At the end of the processing cycle, the output portion A of the processing image PA contains the output states for all outputs. The output states are then transferred block by block to the output modules 6.

The next processing cycle again begins with inputting the signal states of the inputs of the input modules 5. The signal states of the input states and the output states for the output modules are therefore interchanged with the process image PA in each processing cycle.

As already mentioned, the central processing unit 1 does not utilize inputs from and provide outputs to the input and output modules directly upon the instructions of the control program, but works exclusively with the process image PA which is renewed during every processing cycle and is stored in the appropriate area of the process image PA. This increases the processing speed of the control program. Undesirable, shortime responses ("flutter") of a peripheral unit connected to an output of the output modules is reliably prevented since a logically contradictory approach during the processing of the control program is impossible.

In commercially available control units it is generally possible to connect a given number of input and output modules. If such a control unit is employed for controlling a process, usually the full number of input and output modules which can be used are not plugged into the equipment. According to an advantageous further emnbodiment of the present invention, a control track 10 is provided in which the plugged in and not plugged in input modules and output modules are noted. The control track 10 is parallel to the process image PA from an address standpoint. The control track 10 is enabled by the enabling input CS taken from the output signal of an OR gate 14 which has its inputs connected to an address decoder 13 and to the address decoder 15 in the central processing unit 1.

The address decoder 13 generates an enable signal if the address portion of the process image PA is supplied on the address bus 2. The address decoder 15 generates an enable signal if the address portion of the input and the output modules is supplied on the address bus 2. The control track 10 is therefore always addressed if an address of the process image or an address of the input or output modules is supplied on the address bus 2. The address input of the control track 10 is connected to the address bus 2. The data input of the control track 10 is connected to the acknowledgement bus 18. The data output of the control track 10 is connected to the central processing unit 1.

The control track 10 can be established in such a manner that, initially, all input modules and all output modules are marked as not connected. During a starting routine, a control register 16 is set which, among other things, delivers a write enable signal for the control track 10 if a key 17 "New Start" is pushed. The write enable signal is fed to the input of an AND gate 12. The second input of the AND gate 12 is connected via an OR gate 11 to the read command line and the write command line 8 of the control bus 9. The output of the AND gate 12 is brought to the write command input MW (Memory Write) of the control track 10. During the starting routine, the central processing unit 1 sequentially addresses all input modules 5 and all output modules 6. Via the address decoder 15, an enable signal for the input and output modules is delivered. This enable signal also addresses, via the OR gate 14, the selection input CS of the control track 10. The control track 10 is set to write via the write command input MW. Now, if a plugged in input module is addressed, the latter gives an acknowledgement to the acknowledgement bus 18 which is written into the control track 10. This occurs for every plugged in input and output module. The acknowledgement signals of the plugged in input and output modules provide the control bits in the control track. If an addressed input or output module is not plugged in, no acknowledgement signal appears and the respective input or output module remains marked in the control track as not plugged in.

In establishing the control track, all input and output modules can also be marked initially as plugged in. In the start up routine, the control bits of the not plugged in input and output modules are then complemented.

In the block-by-block interchange of the signal states between the process image PA and the input modules and output modules, respectively, only the plugged in input or output modules need to be taken into consideration. If, in a practical, constructed, control not all input and output modules are plugged in, the time required for the interchange of the signal states between the process image PA and the input and output modules, respectively, is shortened through the use of the control track. The control track accelerates the block transfer between the process image and the input modules or output modules, respectively.

In the interchange of the process image with the input modules 5 and the output modules 6, respectively, the central processing unit 1 waits for an acknowledgement via the acknowledgement bus 18 only at every input or output module marked in the control track 10 as plugged in. Therefore, one also has to wait for the maximally permissible acknowledgement delay time only in the case of the plugged in input and output modules, before a decision must be made regarding the further processing of the control program or regarding an alarm "module defective". If, however, the control track were not provided, the central processing unit would have to wait each time an acknowledgement fails to arrive, for the length of the acknowledgement delay time, i.e., even in the case of not plugged in input and output modules.

The control track 10 also makes it possible to recognize programming errors in the control program. If in the processing of the control program an address in the process image PA is selected which is marked in the control track as not connected to an input or output module, the processing unit recognizes the programming error from the corresponding entry in the control track.

What is claimed is:

1. In a memory programmable control with a central processing unit which is connected to a program memory for storing a control program, as well as with input modules having a number of inputs for the signal states from the process, and with output modules having a number of outputs for the output states for the process, the improvement comprising:
- a. providing a memory for storing a process image with an input area and an output area;
- b. providing a control track means;
- c. at the beginning of each processing cycle of the control program, transferring the signal states of the inputs of the input modules block by block into the input area of the process image;
- d. processing the instructions of the control program with the central processing unit using the signal states stored in the input area of the process image memory and storing the determined output states in the output area of the process image;
- e. after each processing cycle, transferring the output states block by block from the process image memory into the output modules; and
- f. addressing said control track means in parallel with the processing image memory and marking therein, by means of control bits, which input modules and output modules are and are not plugged in.

2. The improvement according to claim 1 and further including providing a further processing unit for transferring the inputs of the input states modules into the process image memory and/or for transferring the output states from the process image memory to the output modules.

* * * * *